US008546509B2

(12) United States Patent
Kulke et al.

(10) Patent No.: US 8,546,509 B2
(45) Date of Patent: Oct. 1, 2013

(54) FUNCTIONALIZED PARTICLES

(75) Inventors: Torsten Kulke, North Ferriby (GB);
Gunnar Engelmann, Potsdam (DE);
Gerald Rafler, Potsdam (DE)

(73) Assignee: Huntsman Textile Effects (Germany) GmbH, The Woodlands, TX (US)

( * ) Notice: Subject to any disclaimer, the term of this patent is extended or adjusted under 35 U.S.C. 154(b) by 697 days.

(21) Appl. No.: 11/658,518

(22) PCT Filed: Jul. 25, 2005

(86) PCT No.: PCT/EP2005/053595
§ 371 (c)(1),
(2), (4) Date: Oct. 9, 2008

(87) PCT Pub. No.: WO2006/013165
PCT Pub. Date: Feb. 9, 2006

(65) Prior Publication Data
US 2011/0077375 A1    Mar. 31, 2011

(30) Foreign Application Priority Data

Apr. 8, 2004 (EP) ..................... 04103755

(51) Int. Cl.
*C08G 18/32* (2006.01)
(52) U.S. Cl.
USPC ................... 528/45; 528/68; 528/85
(58) Field of Classification Search
None
See application file for complete search history.

(56) References Cited

U.S. PATENT DOCUMENTS

| 3,870,542 | A |   | 3/1975  | Ida et al. ...................... 117/33.3 |
| 5,112,540 | A | * | 5/1992  | Chen et al. ...................... 264/4.7 |
| 5,225,308 | A | * | 7/1993  | Sasaki et al. ................... 430/138 |
| 5,342,556 | A | * | 8/1994  | Traubel et al. ................... 264/4.7 |
| 5,552,532 | A |   | 9/1996  | Klier et al. ...................... 534/612 |
| 6,890,653 | B2 |  | 5/2005  | Wulff et al. ............... 428/402.21 |
| 2003/0165692 | A1 | | 9/2003 | Koch et al. ................. 428/423.1 |
| 2005/0222360 | A1 | * | 10/2005 | Bruchmann ................... 528/44 |

FOREIGN PATENT DOCUMENTS

| EP | 0 433 094  | 6/1991 |
| EP | 0 537 467  | 4/1993 |
| EP | 0 625 549  | 11/1994 |
| EP | 0 628 102  | 4/1997 |
| JP | 02 006671  | 1/1990 |
| WO | 01/96011   | 12/2001 |
| WO | 03/015910  | 2/2003 |
| WO | 03/061817  | 7/2003 |

OTHER PUBLICATIONS

English Language Abstract from Patent Abstracts of Japan for JP 02006671, vol. 14, No. 134, (1990).
Douglas A. Wicks et al., Progress in Organic Coatings 36, pp. 148-172, (1999).

* cited by examiner

*Primary Examiner* — Randy Gulakowski
*Assistant Examiner* — Jeffrey Washville

(57) ABSTRACT

Functionalized particles having fully formed shells and cores comprising a polyurethane or polyurea matrix obtained by interfacial addition polymerisation of (i) at least one polyisocyanate derivative selected from the group of partially blocked polyisocyanates and polyisocyanates partially modified with fiber reactive groups and (ii) at least one polyamine or polyhydric alcohol, said functionalized particles being capable to chemically or physically bind to a substrate.

11 Claims, No Drawings

FUNCTIONALIZED PARTICLES

The present invention relates to functionalized particles or capsules having a shell core configuration, wherein the polymeric shell comprises a polyurethane or polyurea matrix. The particles may be used as microcontainers to encapsulate different substances. They carry radicals which are capable to permanently bind to the surface of substrates, such as textiles, human hair or paper. This invention relates further to the preparation of the functionalized particles.

The technique of microencapsulation has achieved increasing importance, since this method enables substances of various states of aggregation to be enclosed. Microcapsules have been used as carriers for various different substances, such as, for example, inks and dyestuffs, odor or flavor substances, pharmaceutically active formulations, chemical reagents and plant protection agents.

A further advantage of encapsulating active compounds is that active compounds which are immiscible with one another or incompatible with one another can be combined. Encapsulation of active compounds can also be advantageous in reducing the odor nuisance in the case of odor-intensive active compounds. A further important advantage of encapsulation is that it is thereby possible to achieve release of the active compound in a controlled manner with respect to time and amount (depot action). As a result of this "slow release" effect, the active compound can remain active over a longer period of time and can thereby be better utilized, the number of applications necessary can be decreased and hence, finally, the total amount of active compound to be applied can be reduced.

Numerous mechanical and chemical processes for manufacturing the capsules have already been described and used, for example, J. E. Vandegaer, "Microencapsulation", Plenum-Press, New York-London; 1974. Preparation is suitably carried out by interfacial polymerisation in which one or more monomers polymerise at the interface between a dispersed phase and a continuous phase to form a shell around the dispersed phase. One particular type of interfacial polymerisation is interfacial condensation polymerisation. The polymer shell forms at the interface between an oil phase and an aqueous phase as a result of reaction between a water soluble reactant (in the aqueous phase) and an oil soluble reactant (in the oil phase). Interfacial condensation polymerisation is usually carried out with oil soluble reactants, such as polyisocyanates, polycarboxylic acid chlorides and polysulfonic acid chlorides and water soluble reactants, such as polyamines or polyhydric alcohols, to form capsules having a matrix of polyurea, polyamid or polysulfonamide.

Interfacial condensation polymerisation has been applied for encapsulating a hydrophobic or oil core by forming an oil-in-water dispersion and causing polymerisation around each dispersed oil droplet. Methods for performing this reaction have been developed to allow reasonably satisfactory encapsulation.

Recently, microcapsules containing active substances have been applied also in the textile industry. Microcapsules allow for example for fragrances and perfumes or antimicrobial substances to be encapsulated. Such agents are released and impart fragrance or an antimicrobial effect to the finished textile material in order to reduce or prevent malodors due to perspiration. Furthermore, textiles have been finished with microcapsules containing phase change materials for thermoregulation (Outlast™). In textile application it is desired that the effect imparted stays permanent. Accordingly, the microcapsules have to permanently bind to the textile and resist repeated washing cycles during usage of the apparel.

The present invention accordingly relates to functionalized particles having fully formed shells and cores comprising a polyurethane or polyurea matrix obtained by interfacial addition polymerisation of (i) at least one polyisocyanate derivative selected from the group of partially blocked polyisocyanates and polyisocyanates partially modified with fiber reactive groups and (ii) at least one polyamine or polyhydric alcohol, said functionalized particles being capable to chemically or physically bind to a substrate.

The blocked or modified isocyanate groups act as anchor groups in order to permanently bind the particles, for example, to textile fiber material.

Partially blocked polyisocyanates and polyisocyanates partially modified with fiber reactive groups which form the functionalized particles according to the present invention, may be prepared, for example, from an aromatic polyisocyanate, an aromatic aliphatic polyisocyanate, an alicyclic polyisocyanate, or an aliphatic polyisocyanate. The particular isocyanate selected is not limited by molecular weight. It may be a so-called monomeric isocyanate, or it may be an oligomeric isocyanate.

Examples of the aromatic polyisocyanates include diisocyanates such as 1,4-phenylene diisocyanate, 1,3-phenylene diisocyanate, 4,4'-diphenyl diisocyanate, 1,5-naphthalene diisocyanate, 2,2'- or 2,4'- or 4,4'-diphenylmethane diisocyanate (MDI), 2,4- or 2,6-toluylene diisocyanate (TDI), 4,4'-toluidine diisocyanate, and 4,4'-diphenyl ether diisocyanate; and triisocyanates such as triphenylmethane-4,4',4"-triisocyanate, 1,3,5-triisocyanatebenzene, 2,4,6-triisocyanatetoluene, and 4,4'-diphenyl-methane-2,2',5,5'-tetraisocyanate.

Examples of the aromatic aliphatic polyisocyanates include diisocyanates such as 1,3- or 1,4-xylylene diisocyanate (XDI) or mixtures thereof and 1,3- or 1,4-bis(1-isocyanate-1-methylethyl)benzene or mixtures thereof, and triisocyanates such as 1,3,5-triisocyanate methylbenzene.

Examples of the alicyclic polyisocyanates include diisocyanates such as 1,3-cyclopentene diisocyanate, 1,4-cyclohexane diisocyanate, 1,3-cyclohexane diisocyanate, 3-isocyanate-methyl-3,5,5-trimethylcyclohexyl isocyanate (isophorone diisocyanate or IPDI), 4,4'-methylenebis(cyclohexyl isocyanate) ($H_{12}$MDI or DESMODUR W, available from Bayer), 2,4'-methylenebis(cyclohexyl isocyanate), methyl-2,4-cyclohexane diisocyanate, methyl-2,6-cyclohexane diisocyanate, and 1,3- or 1,4-bis(isocyanatemethyl)cyclohexane, and triisocyanates such as 1,3,5-triisocyanatecyclohexane, 1,3,5-trimethylisocyanate-cyclohexane, 2-(3-isocyanatepropyl)-2,5-di(isocyanatemethyl)-bicyclo(2.2.1) heptane, 2-(3-isocyanatepropyl)-2,6-di(isocyanatemethyl)-bicyclo(2.2.1)heptane, 3-(3-isocyanatepropyl)-2,5-di (isocyanatemethyl)- bicyclo(2.2.1)heptane, 5-(2-isocyanateethyl)-2- isocyanatemethyl-3-(3-isocyanatepropyl)-bicyclo(2.2.1)heptane, 6-(2-isocyanateethyl)-2- isocyanatemethyl-3-(3isocyanatepropyl)-bicyclo(2.2.1)heptane, 5-(2-isocyanateethyl)-2- isocyanatemethyl-2-(3isocyanatepropyl)-bicyclo(2.2.1)heptane, and 6-(2-isocyanateethyl)-2- isocyanatemethyl)-2-(3-isocyanatepropyl)-bicyclo(2.2.1)heptane.

Examples of the aliphatic polyisocyanates include diisocyanates such as trimethylene diisocyanate, tetramethylene diisocyanate, pentamethylene diisocyanate, hexamethylene diisocyanate, dodecane diisocyanate, 1,2-propylene diisocyanate, 1,2-butylene diisocyanate, 2,3-butylene diisocyanate, 1,3-butylene diisocyanate, 2,4,4-or 2,2,4-trimethylhexamethylene diisocyanate, and 2,6-diisocyanatemethylcaproate, and polyisocyanates such as lysine ester triisocyanate, 1,4,8-triisocyanateoctane, 1,6,11-triisocyanateundecane, 1,8-diisocyanate-4-isocyanatemethyloctane, 1,3,6-triisocyanatehexane, and 2,5,7-trimethyl-1,8-diisocyanate-5-isocyanatemethyloctane.

Preferably the polyisocyanate corresponds to a di- or tri-isocyanate, especially a diisocyanate, such as 2,4-toluylene diisocyanate (TDI), 3-isocyanate-methyl-3,5,5-trimethylcyclohexyl isocyanate (IPDI), 4,4'-methylenebis(cyclohexyl isocyanate) ($H_{12}MDI$), 4,4'-diphenylmethane diisocyanate (MDI) and 1,4-xylylene diisocyanate (XDI).

Within the context of the present invention partially blocked polyisocyanates mean polyisocyanates, wherein only a part of the isocyanate groups is reacted with the blocking group precursor. Within the context of the present invention polyisocyanates partially modified with a fiber reactive group mean polyisocyanates, wherein only a part of the isocyanate groups is reacted with the fiber reactive group precursor. The other part of the isocyanate groups of the said polyisocyanate derivatives, which stay unblocked or non-modified are consumed during the interfacial addition polymerization and form the polymeric shell of the micropartides.

Due to the number of isocyanate groups within the polyisocyanate molecule susceptible to such blocking- or modification-reactions statistical mixtures of variously blocked or modified polyisocyanate derivatives, such as the monosubstituted derivative and small amounts of the disubstituted derivative, are obtained beside the unreacted polyisocyanate. The statistical distribution of the possible derivatives and the unreacted polyisocyanate is dependent on the amount of the blocking group precursor or the fiber reactive group precursor applied for the derivatization reaction of the polyisocyanate. Suitable amounts of blocking group precursor or fiber reactive group precursor are, e.g. 1 to 80 mol %, preferably 5 to 30 mol % and especially 10 to 20 mol %, based on the stoichiometric amount of isocyanate groups within the polyisocyanate molecule.

Blocked isocyanates are described in the literature. A comprehensive review on blocked isocyanates is given, for example, by D. A. Wicks, Z. W. Wicks Jr., Progress in Organic Coatings 36 (1999), 148-172.

Blocked isocyanates are usually prepared by reaction of the isocyanate group with an active hydrogen compound as the blocking group precursor. Preparation of the partially blocked polyisocyanates is carried out accordingly by application of less than the stoichiometric amount of the blocking group precursor as indicated above.

Suitable blocking group precursors which come into consideration for the preparation of the partially blocked polyisocyanates are e.g. active methylene compounds such as malonic acid esters (dimethyl malonate, diethyl malonate, t-butyl methyl malonate, di-t-butyl malonate, isopropylidene malonate), aceto-acetates (ethyl acetoacetate), β-diketones (2,4-pentanedione) and cyanoacetates; bisulfites, such as sodium bisulfate; phenols, such as 4-nitrophenol, 4-bromophenol, 2- or 4-hydroxy-benzoic acid, methyl salicylate, methyl-4-hydroxybenzoate, benzyl-4-hydroxybenzoate, 2-ethylhexyl hydroxybenzoate, 2-[(dimethylamino)methyl] phenol, 2-[(dimethylamino)methyl]-nonylphenol and bis(4-hydroxyphenyl)acetic acid; pyridinols, such as 3-hydroxypyridine, 8-hydroxyquinoline, 2-chloro-3-pyridinol and 2- and 8-quinlinols; thiophenols, such as thiophenol; mercaptopyridines, such as 2-mercaptopyridine; alcohols, such as 2-ethylhexyl alcohol, 2-octylalcohol, n-butyl alcohol, furfuryl alcohol, cyclohexyl alcohol, benzyl alcohol, 2-ethoxyethyl alcohol, 2-ethoxyethoxyethyl alcohol, 2-ethylhexyloxyethyl alcohol, 2-butoxyethyl alcohol, 2-butoxyethoxyethyl alcohol, N,N-dibutylglycolamide, N-morpholino ethanol, 2,2-dimethyl-1,3-dioxolane-4-methanol, 3-oxazolidine ethanol, 2-(hydroxymethyl)pyridine, 2-hydroxyethyl-trimethylsilane and 12-hydroxystearic acid; other hydroxy-functional agents, such as N-hydroxysuccinimide, N-hydroxyphthalimide and triphenylsilanol; mercaptanes such as hexyl mercaptan, dodecyl mercaptan, 3-mercaptopropyl-trimethoxysilane and 2-mercaptoethyl-trimethylsilane; oximes, such as acetone oxime, 2-heptanone oxime, 2,2,6,6-tetramethylcyclo-hexanone oxime, diisopropyl ketone oxime, methyl t-butylketone oxime, diisobutylketone oxime, methyl isobutylketone oxime, methyl isopropyl ketone oxime, cyclohexanone oxime, methyl ethyl ketone oxime(butane-2-on-oxime), methyl 2,4-dimethylpentyl ketone oxime, methyl 3-ethylheptyl ketone oxime, methyl isoamyl ketone oxime and methyl n-amyl ketone oxime; amides, such as acetanilide and N-methylacetamide; cyclic amides such as caprolactame, 2-pyrolidone, 6-methyl-2-piperidone and 3,6-dialkyl-2,5-piperazinediones; imides, such as succinimide; imidazoles, such as imidazole, 2-ethyl-4-methylimidazole, 2-methylimidazole and 2-isopropylimidazole; amidines and related compounds such as 1,4,5,6-tetrahydropyrimidine, 2,4-dimethylimidazoline, 4-methylimidazoline, 2-phenylimidazoline, 4-methyl-2-phenylimidazoline and guanidine; pyrazoles such as pyrazole, 3-methylpyrazole and 3,5-dimethylpyrazole; triazoles such as 1,2,4-triazole and benzotriazole; amines such as N-methylaniline, diphenylamine, 2,2,6,6-tetramethylpiperidine, 4-(dimethylamino)-2,2,6,6-tetramethylpiperidine, 2,2,6,6-tetramethyl-4-piperidone, bis(2,2,6,6-tetramethylpiperidinyl)-amine, diisopropylamine, 2,2,4- and 2,2,5-trimethylhexamethylene amine, N-isopropylcyclohexylamine, N-methylhexylamine, dicyclohexylamine, piperidine, 2,6-dimethylpiperidine, bis(3,5,5-trimethylcyclohexyl)amine, ethylene imine, aminocaproic acid, 3-aminopropyl triethoxysilane, 3-aminopropyl trimethoxysilane, 3-aminopropyl-methyl-diethoxysilane, 3-aminopropyl-tris-[2-(2-methoxyethoxy)-ethoxy]silane, 3-(2-aminoethylamino)-propyl-trimethoxysilane, 3-(2-aminoethylamino)-propyl-methyldimethoxysilane, 3-[2-(2-aminoethylamino)-ethylamino]-propyl-trimethoxysilane, aminomethyltrimethylsilane and enamines; benzoxazolone; 3,1-benzoxazine-2,4-dione and benzylmethacrylohydroxamate.

Preferred as the blocking group precursors are oximes, such as butane-2-on-oxime; imidazoles, such as imidazol and amines, such as 3-aminopropyl triethoxysilane.

Fiber reactive groups are known in the art of fiber reactive dyes and described, for example, in Venkataraman "The Chemistry of Synthetic Dyes" Band 6, Seiten 1-209, Academic Press, New York, London 1972 or in EP-A-625,549 and U.S. Pat. No. 5,684,138. Suitable fiber reactive groups include also epoxide derivatives and their precursors and acrylates.

Preparation of the polyisocyanates partially modified with a fiber reactive group is carried out by conversion of less than the stoichiometric amount of the fiber reactive group precursor with the polyisocyanate in an inert solvent as the case may be. The fiber reactive group precursor contains at least one nucleophilic group, such as an amine or hydroxyl group, which is susceptible to react with the isocyanate radical, to form a urea or urethane group, thereby linking the fiber reactive group covalentiy to the polyisocyanate. The reaction is carried out at room temperature or at elevated temperatures in a range of from, for example, 20 to 120° C., preferably 20 to 80° C.

Suitable fiber reactive group precursors which come into consideration for the preparation of the polyisocyanates partially modified with fiber reactive groups are e.g. compounds of the formula $$(Z)_q\text{-}D\text{-}(XH)_s \qquad (1),$$

in which
D is an aliphatic or aromatic organic radical,
Z is a fiber reactive radical,
X is oxygen, sulfur or a radical —NR— and R is hydrogen or
  $C_1$-$C_4$alkyl which is unsubstituted or substituted, and
q and s independently of the other are a number 1, 2 or 3.

$C_1$-$C_4$Alkyl radicals that come into consideration for R are, for example, methyl, ethyl, n-propyl, isopropyl, n-butyl, sec-butyl, tert-butyl and isobutyl, preferably methyl and ethyl and especially methyl. The alkyl radicals may be further substituted, for example by hydroxy, sulfo, sulfato, cyano or by carboxy, preferably hydroxy, sulfo, sulfato or carboxy.

Preferably X is a radical —NR—.
Preferably R is hydrogen, methyl or ethyl and especially hydrogen.
Preferably X is the radical —NR— and R is hydrogen.
Preferably q is the number 1 or 2.
Preferably s is the number 1 or 2.
Preferably q and s are the number 1.
Preferably D is a radical of the benzene or naphthalene series.
Preferably D is a radical of the benzene or naphthalene series, X is the radical —NR— and R is hydrogen and q and s are the number 1.

Suitable substituents for D in the meaning of a radical of the benzene or naphthalene series are, for example, the following: $C_1$-$C_4$alkyl, which is to be understood as meaning methyl, ethyl, n- or iso-propyl, n-, iso-, sec- or tert-butyl; $C_1$-$C_4$alkoxy, which is to be understood as meaning methoxy, ethoxy, n- or iso-propoxy or n-, iso-, sec- or tert-butoxy; phenoxy; $C_2$-$C_6$-alkanoylamino which is unsubstituted or substituted in the alkyl moiety by $C_1$-$C_4$alkoxy, for example acetylamino, methoxyacetylamino or propionylamino; benzoylamino which is unsubstituted or substituted in the phenyl moiety by sulfo, halogen, $C_1$-$C_4$alkyl or $C_1$-$C_4$alkoxy; $C_1$-$C_6$alkoxycarbonylamino which is unsubstituted or substituted in the alkyl moiety by $C_1$-$C_4$alkyl or $C_1$-$C_4$alkoxy; phenoxycarbonylamino, which is unsubstituted or substituted in the phenyl moiety by $C_1$-$C_4$alkyl or $C_1$-$C_4$alkoxy; $C_1$-$C_4$alkoxycarbonyl, for example methoxy- or ethoxycarbonyl; tifluoromethyl; nitro; cyano; halogen, which is generally to be understood as meaning, for example, fluorine, bromine or, in particular, chlorine; ureido; carboxyl; sulfo; sulfomethyl; carbamoyl; carbamido; sulfamoyl; N-phenylsulfamoyl or N—$C_1$-$C_4$alkyl-N-phenylsulfamoyl which are unsubstituted or substituted in the phenyl moiety by sulfo or carboxyl; and methyl- or ethylsulfonyl.

Fibre-reactive radicals Z are to be understood as meaning those which are capable of reacting with the hydroxyl groups of cellulose, the amino, carboxyl, hydroxyl and thiol groups in wool and silk, or with the amino and possibly carboxyl groups of synthetic polyamides, to form covalent chemical bonds. The fibre-reactive radicals Z are as a rule bonded to the radical D directly or via a bridge member. Suitable fibre-reactive radicals Z are, for example, those which contain at least one substituent which can be split off on an aliphatic, aromatic or heterocyclic radical, or in which the radicals mentioned contain a radical which is capable of reaction with the fibre material, for example a vinyl radical.

The fibre-reactive radical Z corresponds, for example, to formula $$-\text{SO}_2-\text{Y}, \qquad (2a)$$

$$-\text{NH}-\text{CO}-(\text{CH}_2)_l-\text{SO}_2-\text{Y}, \qquad (2b)$$

$$-\text{CONR}_2-(\text{CH}_2)_m-\text{SO}_2-\text{Y}, \qquad (2c)$$

$$-\text{NH}-\text{CO}-\text{CH(Hal)}-\text{CH}_2-\text{Hal}, \qquad (2d)$$

$$-\text{NH}-\text{CO}-\text{C(Hal)}=\text{CH}_2, \qquad (2e)$$

(2f)

$$-\underset{X_1}{\underset{|}{NR_{1a}}}\!\!\!\!\!\!\!\!\!\!\!\!\!\!\!\!\!\!\!\!\!\!\!\!\overset{\displaystyle N}{\underset{\displaystyle N}{\bigcirc}}\!\!-T_1 \quad \text{or}$$

(2g)

$$T_2-\underset{X_3}{\underset{|}{\overset{NR_{1b}}{\overset{|}{\bigcirc}}}}\!\!\!\!\!\!\!\!\!\!\!\!\!\!\!\!\!\!\!\!\!\!\!\!\overset{\displaystyle N}{\underset{\displaystyle N}{\bigcirc}}\!\!-X_2,$$

wherein
Hal is chlorine or bromine,
$X_1$ is halogen, 3-carboxypyridin-1-yl or 3-carbamoylpyridin-1-yl,
$T_1$ has independently the same definitions as $X_1$, or is a non-fibre-reactive substituent or a fibre-reactive radical of formula (3a), (3b), (3c), (3d), (3e) or (3f)

$$-\underset{R_2}{\underset{|}{\overset{R_3}{\underset{|}{N}}}}\text{-alk-SO}_2-\text{Y}, \qquad (3a)$$

$$-\underset{R_1}{\underset{|}{N}}\text{-alk-Q-alk}_1\text{-SO}_2-\text{Y}, \qquad (3b)$$

$$-\underset{R_1}{\underset{|}{N}}\text{-arylene-SO}_2-\text{Y}, \qquad (3c)$$

$$-\underset{R_1}{\underset{|}{N}}\text{-arylene-(alk)}_n\text{-W-alk}_1\text{-SO}_2-\text{Y}, \qquad (3d)$$

$$-\text{N}\underset{\phantom{x}}{\bigcirc}\text{N-alk-SO}_2-\text{Y} \quad \text{or} \qquad (3e)$$

$$-\underset{R_1}{\underset{|}{N}}\text{-arylene-NH}-\text{CO}-\text{Y}_1 \qquad (3f)$$

wherein
$R_1$, $R_{1a}$ and $R_{1b}$ are each independently of the others hydrogen or $C_1$-$C_4$alkyl, $R_2$ is hydrogen; $C_1$-$C_4$alkyl unsubstituted or substituted by hydroxy, sulfo, sulfato, carboxy or by cyano; or a radical

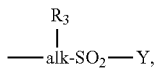

$R_3$ is hydrogen, hydroxy, sulfo, sulfato, carboxy, cyano, halogen, $C_1$-$C_4$alkoxycarbonyl, $C_1$-$C_4$alkanoyloxy, carbamoyl or a group —$SO_2$—Y, alk and $alk_1$ are each independently of the other linear or branched $C_1$-$C_6$alkylene, arylene is a phenylene or naphthylene radical unsubstituted or substituted by sulfo, carboxy, $C_1$-$C_4$alkyl, $C_1$-$C_4$alkoxy or by halogen, Q is a radical —O— or —$NR_1$— wherein $R_1$ is as defined above, W is a group —$SO_2$—$NR_2$—, —$CONR_2$— or —$NR_2CO$— wherein $R_2$ is as defined above, Y is vinyl or a radical —$CH_2$—$CH_2$—U and U is a group removable under alkaline conditions, $Y_1$ is a group —CH(Hal)-$CH_2$-Hal or —C(Hal)=$CH_2$ and Hal is chlorine or bromine, and l and m are each independently of the other an integer from 1 to 6 and n is a number 0 or 1, and $X_2$ is halogen or $C_1$-$C_4$alkylsulfonyl, $X_3$ is halogen or $C_1$-$C_4$alkyl, and $T_2$ is hydrogen, cyano or halogen.

A group U which can be split off under alkaline conditions is, for example, —Cl, —Br, —F, —$OSO_3H$, —$SSO_3H$, —OCO—$CH_3$, —$OPO_3H_2$, —OCO—$C_6H_5$, —$OSO_2$—$C_1$-$C_4$alkyl or —$OSO_2$—N($C_1$-$C_4$alkyl)$_2$. U is preferably a group of the formula —Cl, —$OSO_3H$, —$SSO_3H$, —OCO—$CH_3$, —OCO—$C_6H_5$ or —$OPO_3H_2$, in particular —Cl or —$OSO_3H$, and particularly preferably —$OSO_3H$.

Examples of suitable radicals Y are accordingly vinyl, β-bromo- or β-chloroethyl, β-acetoxyethyl, β-benzoyloxyethyl, β-phosphatoethyl, β-sulfatoethyl and β-thiosulfatoethyl. Y is preferably vinyl, β-chloroethyl or β-sulfatoethyl, and in particular vinyl or β-sulfatoethyl.

$R_1$, $R_{1a}$ and $R_{1b}$ preferably are each independently of the others hydrogen, methyl or ethyl, and especially hydrogen.

$R_2$ is preferably hydrogen or $C_1$-$C_4$alkyl, for example methyl, ethyl, propyl, isopropyl, butyl, isobutyl, sec-butyl or tert-butyl, and especially hydrogen, methyl or ethyl. $R_2$ is more especially hydrogen.

$R_3$ is preferably hydrogen.

l and m preferably are each independently of the other a number 2, 3 or 4, and especially a number 2 or 3.

More especially, l is the number 3 and m is the number 2.

Substituents $T_1$ which are not fibre-reactive are, for example, the following radicals: hydroxyl;

$C_1$-$C_4$alkoxy, for example methoxy, ethoxy, n- or isopropoxy or n-, sec-, iso- or tert-butoxy, in particular methoxy or ethoxy; the radicals mentioned are unsubstituted or substituted in the alkyl moiety, for example by $C_1$-$C_4$alkoxy, hydroxyl, sulfo or carboxyl;

$C_1$-$C_4$alkylthio, for example methylthio, ethylthio, n- or isopropylthio or n-butylthio; the radicals mentioned are unsubstituted or substituted in the alkyl moiety, for example by $C_1$-$C_4$alkoxy, hydroxyl, sulfo or carboxyl;

amino;

N-mono- or N,N-di-$C_1$-$C_6$alkylamino, preferably N-mono- or N,N-di-$C_1$-$C_4$alkylamino; the radicals mentioned are unsubstituted, uninterrupted or interrupted in the alkyl moiety by oxygen or substituted in the alkyl moiety, for example by $C_2$-$C_4$alkanoylamino, $C_1$-$C_4$alkoxy, hydroxyl, sulfo, sulfato, carboxyl, cyano, carbamoyl or sulfamoyl; examples are N-methylamino, N-ethylamino, N-propylamino, N,N-di-methylamino or N,N-di-ethylamino, N-β-hydroxyethylamino, N,N-di-β-hydroxyethylamino, N-2-(β-hydroxyethoxy)ethylamino, N-2-[2-(β-hydroxyethoxy)ethoxy]ethylamino, N-β-sulfatoethylamino, N-β-sulfoethylamino, N-carboxymethylamino, N-β-carboxyethylamino, N-α,β-dicarboxyethylamino, N-α,γ-dicarboxypropylamino, N-ethyl-N-β-hydroxyethylamino or N-methyl-N-β-hydroxyethylamino;

$C_5$-$C_7$cycloalkylamino, for example cyclohexylamino, which includes both the unsubstituted radicals and the radicals substituted in the cycloalkyl ring, for example by $C_1$-$C_4$alkyl, in particular methyl, or carboxyl;

phenylamino or N—$C_1$-$C_4$alkyl-N-phenylamino, which includes both the unsubstituted radicals and the radicals substituted in the phenyl ring, for example by $C_1$-$C_4$alkyl, $C_1$-$C_4$alkoxy, $C_2$-$C_4$alkanoylamino, carboxyl, carbamoyl, sulfo or halogen, for example 2-, 3- or 4-chlorophenylamino, 2-, 3- or 4-methylphenylamino, 2-, 3- or 4-methoxyphenylamino, 2-, 3- or 4-sulfophenylamino, disulfophenylamino or 2-, 3- or 4-carboxyphenylamino; naphthylamino which is unsubstituted or substituted in the naphthyl ring, for example by sulfo, preferably the radicals substituted by 1 to 3 sulfo groups, for example 1- or 2-naphthylamino, 1-sulfo-2-naphthylamino, 1,5-disulfo-2-naphthylamino or 4,8-disulfo-2-naphthylamino;

benzylamino which is unsubstituted or substituted in the phenyl moiety, for example by $C_1$-$C_4$alkyl, $C_1$-$C_4$alkoxy, carboxyl, sulfo or halogen; or N-heterocycles which may or may not contain further hetero atoms, for example, morpholino or piperidin-1-yl.

$T_1$ as a non-fibre-reactive radical is preferably $C_1$-$C_4$alkoxy, $C_1$-$C_4$alkylthio, hydroxy, amino; N-mono- or N,N-di-$C_1$-$C_4$alkylamino unsubstituted or substituted in the alkyl moiety by hydroxy, sulfato or by sulfo; morpholino; or phenylamino or N—$C_1$-$C_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups.

Especially preferred non-fibre-reactive radicals $T_1$ are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, morpholino, 2-, 3- or 4-carboxyphenylamino, 2-, 3- or 4-sulfophenylamino or N—$C_1$-$C_4$alkyl-N-phenylamino.

$X_1$ is preferably halogen, for example fluorine, chlorine or bromine and especially chlorine or fluorine.

$T_2$, $X_2$ and $X_3$ as halogen are, for example, fluorine, chlorine or bromine, especially chlorine or fluorine.

$X_2$ as $C_1$-$C_4$alkylsulfonyl is, for example, ethylsulfonyl or methylsulfonyl and especially methylsulfonyl.

$X_3$ as $C_1$-$C_4$alkyl is, for example, methyl, ethyl, n- or isopropyl, n-, iso- or tert-butyl and especially methyl.

$X_2$ and $X_3$ are preferably each independently of the other chlorine or fluorine.

$T_2$ is preferably cyano or chlorine.

Hal is preferably bromine.

alk and $alk_1$ are each independently of the other, for example, a methylene, ethylene, 1,3-propylene, 1,4-butylene, 1,5-pentylene or 1,6-hexylene radical or a branched isomer thereof.

alk and alk$_1$ are preferably each independently of the other a C$_1$-C$_4$alkylene radical and especially an ethylene radical or propylene radical.

arylene is preferably a 1,3- or 1,4-phenylene radical unsubstituted or substituted, for example, by sulfo, methyl, methoxy or by carboxy, and especially an unsubstituted 1,3- or 1,4-phenylene radical.

Q is preferably —NH— or —O— and especially —O—.

W is preferably a group of formula —CONH— or —NHCO—, especially a group of formula —CONH—.

n is preferably the number 0.

The reactive radicals of formulae (3a) to (3f) are preferably those wherein W is a group of formula —CONH—, R$_1$ is hydrogen, methyl or ethyl, R$_2$ and R$_3$ are each hydrogen, Q is a radical —O— or —NH—, alk and alk$_1$ are each independently of the other ethylene or propylene, arylene is phenylene unsubstituted or substituted by methyl, methoxy, carboxy or by sulfo, Y is vinyl or β-sulfatoethyl, Y$_1$ is —CHBr—CH$_2$Br or —CBr=CH$_2$ and n is the number 0.

A fibre-reactive radical present in D corresponds preferably to a radical of formula (2a), (2b), (2c), (2d), (2e) or (2f) wherein Y is vinyl, β-chloroethyl or β-sulfatoethyl, Hal is bromine, R$_2$ and R$_{1a}$ are hydrogen, m and l are a number 2 or 3, X$_1$ is halogen, T$_1$ is C$_1$-C$_4$alkoxy, C$_1$-C$_4$alkylthio, hydroxy, amino; N-mono- or N,N-di-C$_1$-C$_4$alkylamino unsubstituted or substituted in the alkyl moiety by hydroxy, sulfato or by sulfo; morpholino; or phenylamino or N—C$_1$-C$_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups, or is a fibre-reactive radical of formula (3a'), (3b'), (3c'), (3d') or (3f')

 (3a')

 (3b')

 (3c')

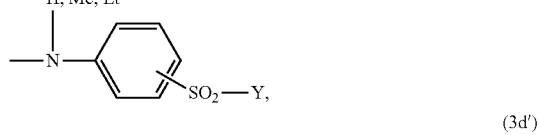 (3d')

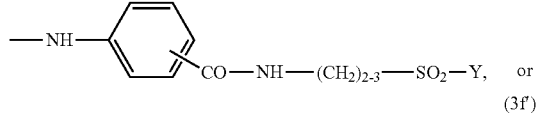 (3f')

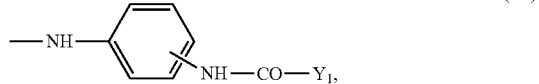

especially (3c') or (3d'), wherein
Y is as defined above, and
Y$_1$ is a group —CH(Br)—CH$_2$—Br or —C(Br)=CH$_2$.

In the case of the radicals of formulae (3a') and (3b'), Y is preferably β-chloroethyl. In the case of the radicals of formulae (3c') and (3d'), Y is preferably vinyl or β-sulfatoethyl.

In an interesting embodiment of the present invention fiber reactive group precursors which come into consideration for the preparation of the polyisocyanates partially modified with fiber reactive groups are e.g. compounds of the formula (1), in which D as an aliphatic radical is a C$_2$-C$_8$alkylene radical which may be interrupted by oxygen, X is as defined and preferred above, and Z is a radical of formula (2a).

D in the meaning of a C$_2$-C$_8$alkylene radical is preferably a C$_2$-C$_6$alkylene radical, especially a C$_2$-C$_4$alkylene radical, interrupted by oxygen, e.g. the radicals —(CH$_2$)$_2$—O—(CH$_2$)$_2$—, —(CH$_2$)$_3$—O—(CH$_2$)$_2$— or —(CH$_2$)$_3$—O—(CH$_2$)$_3$—, especially the radical —(CH$_2$)$_2$—O—(CH$_2$)$_2$—.

D in the meaning of a radical of the benzene or naphthalene series is especially a phenylene or naphtylene radical which is unsubstituted or substituted by at least one substituent, such as one, two or three substituents, selected from the group halogen, C$_1$-C$_4$alkyl, C$_1$-C$_4$alkoxy, carboxy and sulfo.

Preferably, the fiber reactive group precursor is a compound of the formula

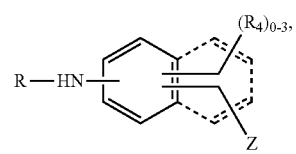 (1a)

wherein

R is as defined and preferred above, (R$_4$)$_{0-3}$ denotes from 0 to 3 identical or different substituents selected from the group halogen, C$_1$-C$_4$alkyl, C$_1$-C$_4$alkoxy, carboxy and sulfo, Z is a radical of formula (2a), (2c), (2d), (2e) or (2f) indicated above, wherein R$_{1a}$ and R$_2$ are hydrogen, Hal is bromine, Y is vinyl, β-chloroethyl or β-sulfatoethyl, T$_1$ is C$_1$-C$_4$alkoxy, C$_1$-C$_4$alkylthio, hydroxy, amino; N-mono- or N,N-di-C$_1$-C$_4$alkylamino unsubstituted or substituted in the alkyl moiety by hydroxy, sulfato or by sulfo; morpholino; or phenylamino or N—C$_1$-C$_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy; or naphthylamino unsubstituted or substituted by from 1 to 3 sulfo groups, or is a fibre-reactive radical of formula (3c') or (3d') indicated above, and Y is as defined above, X$_1$ is chlorine or fluorine, and m is a number 2 or 3.

R$_4$ as C$_1$-C$_4$alkyl may be, for example, methyl, ethyl, n-propyl, isopropyl, n-butyl, sec-butyl, tert-butyl or isobutyl, preferably methyl or ethyl and especially methyl.

R$_4$ as C$_1$-C$_4$alkoxy may be, for example, methoxy, ethoxy, n-propoxy, isopropoxy, n-butoxy or isobutoxy, preferably methoxy or ethoxy and especially methoxy.

R$_4$ as halogen may be, for example, fluorine, chlorine or bromine, preferably chlorine or bromine and especially chlorine.

Especially, the fiber reactive group precursor is a compound of the formula

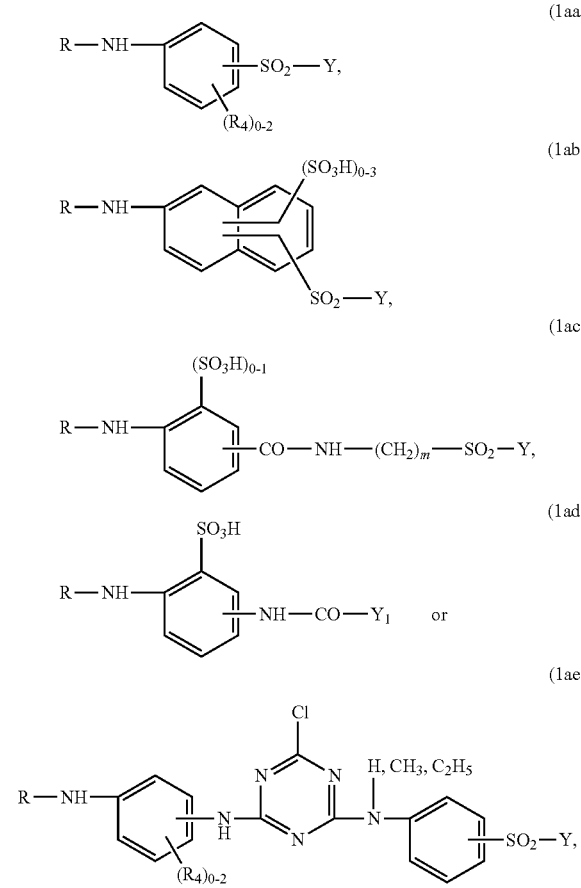

wherein
R is as defined and preferred above,
$(R_4)_{0-2}$ denotes from 0 to 2 identical or different substituents selected from the group halogen, $C_1$-$C_4$alkyl, $C_1$-$C_4$alkoxy and sulfo, especially methyl, methoxy and sulfo,
$Y_1$ is a group —CH(Br)—CH$_2$—Br or —C(Br)=CH$_2$,
Y is vinyl, β-chloroethyl or β-sulfatoethyl, especially vinyl or β-sulfatoethyl, and
m is a number 2 or 3, especially 2.

Especially preferred, the fiber reactive group precursor is a compound of the formula (1aa) or (1ac).

The compounds of formula (1) are known or can be prepared according to known procedures described in the art of reactive dyestuffs.

Polyisocyanates partially modified with a fiber reactive group are new and represent another subject matter of the present invention. The variables are as defined and preferred above.

Polyhydric alcohols suitable for the preparation of the functionalized particles may be, for example, a polyether polyol, polyester polyol, polycarbonate polyol, and hydrocarbon polyol.

Polyether polyols may be homopolymers or copolymers of alkylene oxides including $C_2$-$C_5$-alkylene oxides such as, for example, ethylene oxide, propylene oxide, butylene oxide, tetrahydrofuran, and 3-methyltetrahydrofuran; homopolymers or copolymers of the above alkylene oxides obtained by using, as an initiator, $C_{14}$-$C_{40}$-polyols, such as 12-hydroxystearyl alcohol and hydrogenated dimerdiol; and adducts of the above alkylene oxides with bisphenol-A or hydrogenated bisphenol-A. These polyether polyols may be used alone or in combination of two or more. Specific examples are polyoxyethylene glycol, polyoxypropyleneglycol, polyoxyethylene polyoxytetramethylene glycol, polyopxypropylenepolyoxytetra-methylene glycol, and polyoxyethylene polyoxypropylene polyoxytetramethylene glycol.

Polyester polyols may be, for example, addition reaction products of a diol component and a lactone, reaction products of the diol component and a polyvalent carboxylic acid, and addition reaction products of three components, including the diol component, a dibasic acid, and the lactone. The diol component may be $C_2$-$C_{40}$-aliphatic diols with a low molecular weight such as ethylene glycol, propylene glycol, diethylene glycol, dipropylene glycol, 1,4-butanediol, 1,5-pentanediol, 3-methyl-1,5-pentanediol, 2,4-diethyl-1,5-pentanediol, 1,6-hexane glycol, neopentyl glycol, 1,9-nonanediol, 1,10-decanediol, 12-hydroxystearyl alcohol, and hydrogenated dimerdiol; and an alkylene oxide adduct of bisphenol-A. The lactone may be, for example, ε-caprolactone, δ-valerolactone, and β-methyl-deltavalerolactone. The polyvalent carboxylic acid may be, for example, aliphatic dicarboxylic acids such as succinic acid, adipic acid, azelaic acid, sebacic acid, and dodecanedioic acid; and aromatic dicarboxylic acids such as hexahydrophthalic acid, tetrahydrophthalic acid, phthalic acid, isophthalic acid, and terephthalic acid.

Polycarbonate polyols may be, for example, polycarbonate diols which are obtainable by a reaction of a short chain dialkylcarbonate and a component selected from aforementioned polyether polyols, polyester polyols and diol components such as 2-methylpropanediol, dipropylene glycol, 1,4-butanediol, 1,6-hexanediol, 3-methyl-1,5-pentanediol, neopentyl glycol, 1,5-octanediol, and 1,4-bis-(hydroxymethyl)cyclohexane. The short chain dialkylcarbonate may be $C_1$-$C_4$-alkylcarbonates such as, for example, dimethylcarbonate and diethylcarbonate.

Polyols with a low molecular weight may be used. Examples of polyols with a low molecular weight include ethylene glycol, 1,2- or 1,3-propylene glycol, tripropylene glycol, 1,3- or 1,4-butanediol, 1,5-pentanediol, neopentyl glycol, 1,6-hexanediol, 1,9-nonanediol, 1,10-decanediol, 1,2, 6-hexanetriol, glycerol, trimethylolethane, trimethylolpropane, higher fatty acid polyols and higher hydrocarbon polyols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol (juniperic acid or a reduction product of thapcic acid), 1,21-henicosanediol, chimyl alcohol, batyl alcohol, selachyl alcohol, and dimeric acid diol.

Polyamine compounds suitable for the preparation of the functionalized particles may be selected from the group consisting of aromatic polyamines, aliphatic polyamines and alicyclic polyamines. Typical examples include polyvinyl amine, polyvinyl imine, 1,2-ethylenediamine, hydrazine, hydrazine-2-bis-(3-aminopropyl)-amine, 1,4-diaminocyclohexane, 3-amino-1-methylaminopropane, N-hydroxyethylethylenediamine, N-methyl-bis-(3-aminopropyl)-amine, tetraethylenediamine, hexamethylenediamine, 1-aminoethyl-1, 2-ethylenediamine, diethylenetriamine, tetraethylenepentamine, pentaethylenehexamine, phenylenediamine, toluylenediamine, 2,4,6-triaminotoluenetrihydrochlorides, 1,3,6-triaminonaphthalene, isophoronediamine, xylylenediamine, hydrogenated xylylenediamine, 4,4'-diaminophenylmethane, hydrogenated 4,4'-diaminodiphenylmethane, and derivatives of these polyamine monomers. Aliphatic and/or alicyclic polyamines are preferred. The polyamines mentioned may be used individually or as mixtures of at least two polyamines.

Polyamine compounds are preferred for the preparation of the functionalized microparticles according to the present invention.

Examples of aminoalcohols are N-aminoethylethanolamine, ethanolamine, diethanolamine and aminopropyl alcohol.

The hydrophobic oil-phase to be dispersed in the aqueous phase may be reduced in viscosity by adding, as required, a non-reactive hydrophobic organic solvent. The amount of the organic solvent in this case is suitably not more than 80% by weight based on the weight of the entire hydrophobic phase. Examples of organic solvents that can be used include aromatic hydrocarbons; aliphatic hydrocarbons; esters, such as dimethylphtalate; ethers; and ketones. As required, these organic solvents may be removed by heating or pressure reduction during or after forming the polymer microparticles.

The aqueous phase in which the hydrophobic phase is to be dispersed may contain 0.1 to 20% by weight based on the aqueous phase of at least one protective colloid such as polyvinyl alcohol, hydroxyalkyl celluloses, carboxyalkyl celluloses, gum arabic, polyacrylates, polyacrylamides, polyvinylpyrrolidone and ethylene maleic anhydride copolymer. The aqueous phase may contain 0.1 to 10% by weight based on the aqueous phase of nonionic, anionic or cationic surface-active agents.

The particles of this invention may contain various substances as a core material in the particles. The core material is finally taken up into the interiors of the particles by including it in the hydrophobic oil-phase in advance. Typical examples of the core substances include pigments, pharmaceutical active compounds, antimicrobial substances, perfumes, fragrances, flavorings, cosmetic actives, flame retardants, vitamins, phase change materials, catalysts and enzymes. As required, the particles of this invention may contain plasticizers, paraffins, animal and vegetable oils, silicone oils and synthetic resins (e.g. xylene resins and ketone resins) so long as they are inert to the isocyanate groups.

The process for producing the functionalized particles of this invention will be briefly described below:

The step of dispersing the hydrophobic phase in the aqueous phase is carried out at a temperature of from e.g. 5 to 90° C. to stabilize the dispersion. The dispersion may be carried out easily by a suitable dispersing device such as a high speed agitator, homogenizer, a homodisperser or a propellar-type general stirrer or by a customery action.

In many cases, it is preferred to stir the dispersion mildly by using a propellar-type stirrer after the end of the dispersing step.

The average particle size is dependent on the temperature and the agitation speed, whereby a high agitation speed and a high temperature favor a small particle size. Furthermore, average particle size can be controlled by the viscosity of the reaction medium. The viscosity may be adjusted by adding viscosity regulating agents or thickeners such as commercially available alginate thickeners, starch ethers or locust bean flour ethers, sodium alginate on its own or in admixture with modified cellulose, e.g. methylcellulose, ethylcellulose, carboxymethylcellulose, hydroxyethylcellulose, methylhydroxyethylcellulose, hydroxypropyl cellulose or hydroxypropyl methylcellulose, especially with preferably from 20 to 25% by weight carboxymethylcellulose. Synthetic thickeners that may be mentioned are, for example, those based on poly(meth)acrylic acids, poly(meth)acrylamides or polyvinyl pyrrolidones.

Before or after the addition of the polyamine or polyhydric alcohol, particularly before it, an organic metal catalyst promoting urethanization reaction, such as dibutyltin dilaurate, may be added in an amount of 5 to 10,000 ppm based on the entire dispersion.

The polyamine or polyhydric alcohol is added to the dispersion at a temperature of from e.g. 5 to 90° C. Preferably, the polyamine or polyhydric alcohol is added after it is diluted with water so that its effective amount becomes 5 to 70%.

After e.g. 1 to 180 minutes, preferably 5 to 60 minutes, the reaction temperature is increased e.g. to 40 to 95° C., preferably 40 to 65° C. The reaction mixture is maintained at this temperature for e.g. 1 to 180 minutes, preferably 5 to 120 minutes, to give tough crosslinked micropartides, which are nearly perfectly spherical.

The resulting particles are used according to the respective purposes. They may be used in the form of a fine powder after drying them by a spray drying method, a concentric separating drying method, a filtration drying method or a fluidized bed drying method.

In the functionalized micropartides of the invention so obtained, the reaction is sufficiently completed to such an extent that no appreciable trace of the unreacted isocyanate groups is seen in the interior. Accordingly, the particles are very tough and have excellent solvent resistance.

Accordingly, the present invention relates to a process for the preparation of functionalized particles of the present invention which process comprises the steps of preparing an oil-in-water dispersion and causing condensation polymerisation at the oil-water interface around each dispersed oil droplet of (i) at least one polyisocyanate derivative selected from the group of partially blocked polyisocyanates and polyisocyanates partially modified with fiber reactive groups dissolved in the hydrophobic oil phase and (ii) at least one polyamine or polyhydric alcohol dissolved in the aqueous phase, wherein the variables are defined and preferred as given above.

Preferably the preparation process is carried out by additionally including in the hydrophobic oil-phase a substance which is to be encapsulated.

The functionalized microparticles according to the present invention are able to react with various compounds or substrates which contain nudeophilic groups, e.g. —OH, —NH or —SH, with their fiber reactive radicals or blocked isocyanate groups attached to their outer shell. The blocked isocyanate groups deblock at elevated temperatures of from, for example, 100 to 230° C., preferably 120 to 180° C., and form covalent bonds with the nucleophilic sites of the compounds or substrates. The fiber reactive radicals form covalent bonds at room temperature or elevated temperatures of from, for example, 0 to 230° C., preferably 20 to 80° C. in wet applications and 120 to 180° C. in dry applications, in the presence of e.g. alkali, such as soda, sodium hydroxide or potassium hydroxide, as it is known in the art of textile dyeing or printing with reactive dyestuffs.

Compounds which come into consideration are low molecular weight compounds, for example, alcohols, thiols or amines, or high molecular weight compounds, such as natural or synthetic polymers or a mixture of various polymer types, for example, starches, celluloses, glycogens, mannans, pectins, chitins, chitosans, alginic acid, albumins, collagen, elastin, globulins, fibrinogens, keratins, lignins, polyesters, polyamides, polyamines, phenolics, aminoplastics, polyurethanes, polyacrylic acids, polyacrylamides, polyallyl alcohols, polyallylamines, polyvinyl acetate polymers, polyvinyl alcohols, polyepoxides, cellulose-acrylates, starch-acrylates, biopolymers containing polysaccharide moieties, such as glycopeptides or starch protein and the like. Substrates which come into consideration comprise, for example, the polymers mentioned above which are substantially insoluble in water. They are, for example, in the form of pellets, beads, sheets or fibers. Examples are polymer beads, paper, textile fiber materials, keratinic fibers, such as human hair or leather. As possible substrates there come into consideration also self-assembled monolayers (SAMs) on silver or gold substrates bearing e.g. terminal hydroxyl, thiol or amino groups. SAMs are described, for example, in Science 1991, 254 (5036), 1312-1319; Journal of Physical Chemistry B, 1998, 102(2), 426-436; or WO-A-98/58 967. Modification of said substrates with the functionalized microparticles affects, in particular, the surface or surface near regions.

Accordingly, the present invention relates also to a process for the preparation of compounds or substrates modified with functionalized micropartides, comprising reacting the said compounds or substrates with the functionalized microparticles according to the present invention, so that the microparticles stick to the compounds or substrates, wherein the variables are as defined and preferred above.

The modification of the compounds and the surface modification of substrates may be carried out, for example, in aqueous solution, suitably in the presence of a surfactant.

Modified compounds or substrates may be used, e.g.:
- to improve adhesion to surfaces,
- to solubilize the polymer/oligomer in the corresponding matrix,
- to render the polymer hydrophilic or hydrophobic,
- to improve wettability and compatibility with the surrounding medium,
- to increase stability to coagulation,
- to modify rheology,
- to improve film formation,
- to encapsulate active substances, such as biocides, insecticides, acaricides, fungicides, herbicides, pheromones, fragrances, flavorings, pharmaceutical active compounds, active compounds for antistatic finishing or flame retardant finishing, UV-stabilizers, dyestuffs, pigments or mixtures thereof and release the active compounds in a controlled manner,
- to increase the bioavailability of active compounds,
- to encapsulate phase change materials for textile application, such as semisynthetic glycerides.
- to stabilize active compounds, e.g. to light, temperature, oxidation, hydrolysis, evaporation by complex formation,
- to solubilize active compounds,
- decrease toxicity or irritation of active compounds by encapsulation.

Preferred as the substrates are fiber materials containing hydroxyl groups or containing nitrogen, such as textile fiber materials, keratineous fibers, e.g. human hair, or paper, in particular textile fiber materials. Textile fiber materials can be in the form of fiber, yarn or piece goods, such as non-wovens, knitted and woven goods, pile fabrics or terry goods. Examples are silk, wool, polyamide fibers and polyurethanes, and in particular all types of cellulosic fiber materials. Such cellulosic fiber materials are, for example, the natural cellulosic fibers, such as cotton, linen and hemp, as well as cellulose and regenerated cellulose. The functionalized microparticles according to the invention are also suitable for finishing fibers containing hydroxyl groups which are contained in blend fabrics, for example mixtures of cotton with polyester fibers or polyamide fibers. The functionalized microparticles according to the invention are particularly suitable for finishing cellulosic materials. They can furthermore be used for finishing natural or synthetic polyamide fiber materials.

The functionalized microparticles according to the present invention are applied to the textile goods in aqueous solution, in analogy to the dyeing processes known for reactive dyes or finishing processes in textile industry. They are suitable for spray-, exhaust- and for the pad-method, in which the goods are impregnated with aqueous solutions, which may contain salts. Dyeing machines customary in dyeing with reactive dyes are preferably utilized for this. The functionalized microparticles according to the present invention are fixed, if appropriate after an alkali treatment, or preferably in the presence of alkali, under the action of heat, steam or by storage at room temperature for several hours, thereby forming a chemical bond with the substrate. The functionalized micropartides according to the present invention can also be applied in the presence of crosslinking agents or resin finish, for example, dimethylol-urea, dimethoxy-methyl-urea, trimethoxy-methyl-melamin, tetramethoxy-methyl-melamine, hexamethoxy-methyl-melamine, dimethylol-dihydroxy-ethylene-urea, dimethylol-propylene-urea, dimethylol-4-methoxy-5,5'-dimethyl-propylene-urea, dimethylol-5-hydroxypropylene-urea, butane-tetra-carboxylic-acid, citric acid, maleic acid, bonding agents, for example, acrylates, silicones, urethanes, butadienes, in a textile finishing process which may result in superior effect durability. Such textile finishing processes are described, for example, in DE-A-40 35 378. After the fixing, the finished substrates are rinsed thoroughly with cold and hot water, if appropriate with the addition of an agent which has a dispersing action and promotes diffusion of the non-fixed portions.

The finished substrates contain, for example, 0.1 to 25% by weight, preferably 1 to 10% by weight, of the functionalized micropartides according to the present invention, based on the total weight of the substrate.

The following Examples illustrate the present invention. Parts and percentages are by weight unless otherwise specified.

EXAMPLE 1

Preparation of Diisocyanates Partially Blocked with Oximes (Blocking Degree 15%):

5.0 g (28.59 mmole) of 2,4-toluylene diisocyanate are dissolved in 30 ml of methylene chloride. To this solution at room temperature a solution of 0.75 g (8.58 mmole) of butane-2-on-oxime in 10 ml of methylene chloride is added dropwise while stirring vigorously. The reaction mixture is heated under reflux for 30 minutes and the solvent is distilled off. A viscous liquid is obtained which is used directly for the preparation of the micropartides.

EXAMPLES 2 TO 7

Partially blocked 2,4-toluylene diisocyanates are likewise obtained with a blocking degree as given in Table 1 by proceeding as indicated in Example 1, but using the amount of butane-2-on-oxime as given in Table 1 in place of 0.75 g of butane-2-on-oxime.

TABLE 1

| Example | butane-2-on-oxime [g] | Blocking degree [%] |
|---------|----------------------|---------------------|
| 2       | 0.50                 | 10                  |
| 3       | 1.00                 | 20                  |

TABLE 1-continued

| Example | butane-2-on-oxime [g] | Blocking degree [%] |
|---|---|---|
| 4 | 1.25 | 25 |
| 5 | 1.50 | 30 |
| 6 | 2.00 | 40 |
| 7 | 2.50 | 50 |

EXAMPLE 8

Preparation of Diisocyanates Partially Modified with a Fiber Reactive Group (Blocking Degree 15%):

2.5 g of the amine of the formula $D_{10}$-$NH_2$, wherein $D_{10}$ is a radical of formula

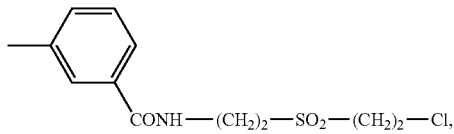

previously dried over phoshorous pentoxide in a vacuum, are dissolved in 4 g of absolute dimethyl acetamide by gentle heating. To this solution 5.0 g (28.59 mmole) of 2,4- or 2,6-toluylene diisocyanate are added dropwise while stirring vigorously and the reaction is continued for 1 h at 40° C. The resulting solution can be used directly for the preparation of the microparticles.

EXAMPLES 9 TO 14

Partially modified 2,4-toluylene diisocyanates are likewise obtained with a blocking degree as given in Table 2 by proceeding as indicated in Example 8, but using the amount of the amine of the formula $D_{10}$-$NH_2$ as given in Table 2 in place of 2.5 g of the amine of the formula $D_{10}$-$NH_2$.

TABLE 2

| Example | $D_{10}$-$NH_2$ [g] | Blocking degree [%] |
|---|---|---|
| 9 | 1.67 | 10 |
| 10 | 3.33 | 20 |
| 11 | 4.17 | 25 |
| 12 | 5.00 | 30 |
| 13 | 6.67 | 40 |
| 14 | 8.33 | 50 |

EXAMPLES 15 TO 37

Partially modified 2,4-toluylene diisocyanates are likewise obtained by proceeding as indicated in Example 8, if an equimolar amount of the amines of the formula $D_{xy}$-$NH_2$ listed in Table 3 is used in place of 2.5 g of the amine of the formula $D_{10}$-$NH_2$.

TABLE 3

| Exp. | Amine $D_{xy}$—$NH_2$ | $D_{xy}$ |
|---|---|---|
| 15 | $D_{11}$—$NH_2$ | $D_{11}$ = (phenyl)—$SO_2$—$CH_2$—$CH_2$—$OSO_3H$ |
| 16 | $D_{12}$—$NH_2$ | $D_{12}$ = $HO_3S$-(phenyl)—$SO_2$—$CH_2$—$CH_2$—$OSO_3H$ |
| 17 | $D_{13}$—$NH_2$ | $D_{13}$ = $HO_3S$-(phenyl)—HN—C(=O)—CHBr—CH$_2$Br |
| 18 | $D_{14}$—$NH_2$ | $D_{14}$ = (phenyl)—CONH—$(CH_2)_2$—$SO_2$—$(CH_2)_2$—Cl |
| 19 | $D_{15}$—$NH_2$ | $D_{15}$ = $HO_3S$-(phenyl)—CONH—$(CH_2)_2$—$SO_2$—$(CH_2)_2$—Cl |
| 20 | $D_{16}$—$NH_2$ | $D_{16}$ = (phenyl)—CONH—$(CH_2)_2$—$SO_2$—$(CH_2)_2$—$OSO_3H$ |

TABLE 3-continued

| Exp. | Amine $D_{xy}$—$NH_2$ | $D_{xy}$ |
|---|---|---|
| 21 | $D_{17}$—$NH_2$ | $D_{17}$ = 3-sulfo-4-methylbenzoyl group: HO₃S and CH₃ substituted benzene with —CONH—(CH₂)₂—SO₂—(CH₂)₂—OSO₃H |
| 22 | $D_{18}$—$NH_2$ | $D_{18}$ = benzene ring with OCH₃, CH₃ substituents and —SO₂—CH₂—CH₂—OSO₃H |
| 23 | $D_{19}$—$NH_2$ | $D_{19}$ = benzene ring with OCH₃, two CH₃ substituents and —SO₂—CH₂—CH₂—OSO₃H |
| 24 | $D_{20}$—$NH_2$ | $D_{20}$ = benzene ring with OCH₃, CH₃, OCH₃ substituents and —SO₂—CH₂—CH₂—OSO₃H |
| 25 | $D_{21}$—$NH_2$ | $D_{21}$ = naphthalene with SO₃H, CH₃ and —SO₂—CH₂—CH₂—OSO₃H |
| 26 | $D_{22}$—$NH_2$ | $D_{22}$ = naphthalene with SO₃H, CH₃ and —SO₂—CH₂—CH₂—OSO₃H |
| 27 | $D_{23}$—$NH_2$ | $D_{23}$ = naphthalene with CH₃ and —SO₂—CH₂—CH₂—OSO₃H |
| 28 | $D_{24}$—$NH_2$ | $D_{24}$ = naphthalene with CH₃, SO₃H and —SO₂—CH₂—CH₂—OSO₃H |
| 29 | $D_{25}$—$NH_2$ | $D_{25}$ = naphthalene with CH₃ and —SO₂—CH₂—CH₂—OSO₃H |

TABLE 3-continued

| Exp. | Amine $D_{xy'}$—$NH_2$ | $D_{xy}$ |
|---|---|---|
| 30 | $D_{26}$—$NH_2$ | $D_{26}$ = 5-methyl-naphthalen-2-yl—$SO_2$—$CH_2$—$CH_2$—$OSO_3H$ |
| 31 | $D_{27}$—$NH_2$ | $D_{27}$ = 4-($HO_3S$)-3-methyl-phenyl with —NH—CO—CHBr—$CH_2$Br |
| 32 | $D_{28}$—$NH_2$ | $D_{28}$ = 4-methyl-3-($HO_3S$)-phenyl—NHCO—$(CH_2)_3$—$SO_2$—$(CH_2)_2$—Cl |
| 33 | $D_{29}$—$NH_2$ | $D_{29}$ = 4-($HO_3S$)-3-methyl-phenyl—NHCO—$(CH_2)_3$—$SO_2$—$(CH_2)_2$—Cl |
| 34 | $D_{30a}$—$NH_2$–$D_{30r}$—$NH_2$ | $D_{30a}$—$D_{30r}$ = 4-($HO_3S$)-3-methyl-phenyl-NH-(triazine with $T_1$ and Cl substituents) |
| | $T_1$: | |
| 34a | $D_{30a}$—$NH_2$ | $D_{30a}$ —NH—C$_6$H$_4$—$SO_3H$ (para) |
| 34b | $D_{30b}$—$NH_2$ | $D_{30b}$ —NH—(3-methylphenyl) |
| 34c | $D_{30c}$—$NH_2$ | $D_{30c}$ —NH—(3-(NHCO—$CH_3$)phenyl) |
| 34d | $D_{30d}$—$NH_2$ | $D_{30d}$ —NH—(2-chlorophenyl) |
| 34e | $D_{30e}$—$NH_2$ | $D_{30e}$ —$NHCH_2CH_2OH$ |
| 34f | $D_{30f}$—$NH_2$ | $D_{30f}$ —$N(CH_2CH_2OH)_2$ |

TABLE 3-continued

| Exp. | Amine $D_{xy'}$—NH$_2$ | $D_{xy}$ |
|------|------|------|
| 34g | $D_{30g}$—NH$_2$ | $D_{30g}$ —N(CH$_2$—CH$_2$—OH)(CH$_2$—CH$_3$) |
| 34h | $D_{30h}$—NH$_2$ | $D_{30h}$ —N(CH$_2$—CH$_2$—OH)(CH$_3$) |
| 34i | $D_{30i}$—NH$_2$ | $D_{30i}$ —NH—(CH$_2$)$_2$—O—(CH$_2$)$_2$—OH |
| 34j | $D_{30j}$—NH$_2$ | $D_{30j}$ —NHCH$_2$CH$_2$SO$_3$H |
| 34k | $D_{30k}$—NH$_2$ | $D_{30k}$ —N(CH$_2$—CH$_2$—SO$_3$H)(CH$_3$) |
| 34l | $D_{30l}$—NH$_2$ | $D_{30l}$ —N(morpholino) |
| 34m | $D_{30m}$—NH$_2$ | $D_{30m}$ —NH—(CH$_2$)$_2$—SO$_2$—(CH$_2$)$_2$—Cl |
| 34n | $D_{30n}$—NH$_2$ | $D_{30n}$ —NH—(CH$_2$)$_2$—O—(CH$_2$)$_2$—SO$_2$—(CH$_2$)$_2$—Cl |
| 34o | $D_{30o}$—NH$_2$ | $D_{30o}$ —NH—C$_6$H$_4$—SO$_2$—CH$_2$CH$_2$—OSO$_3$H (para) |
| 34p | $D_{30p}$—NH$_2$ | $D_{30p}$ —NH—C$_6$H$_4$—SO$_2$—CH$_2$CH$_2$—OSO$_3$H (meta) |
| 34q | $D_{30q}$—NH$_2$ | $D_{30q}$ —NH—C$_6$H$_4$—CONH(CH$_2$)$_2$SO$_2$(CH$_2$)$_2$—OSO$_3$H (meta) |
| 34r | $D_{30r}$—NH$_2$ | $D_{30r}$ —NH—C$_6$H$_3$(SO$_3$H)(NHCO—CHBr—CH$_2$Br) |
| 35 | $D_{31}$—NH$_2$ | $D_{31}$ = 4-(HO$_3$S)-3-methylphenyl-NH— attached to 2,5,6-trichloropyrimidin-4-yl |

TABLE 3-continued

| Exp. | Amine $D_{xy'}$—NH$_2$ | $D_{xy'}$ |
|---|---|---|
| 36 | $D_{32}$—NH$_2$ | $D_{32}$ = (4-sulfo-3-methylphenyl)-HN-(5-chloro-2,6-difluoropyrimidin-4-yl) |
| 37 | $D_{33}$—NH$_2$ | $D_{33}$ = (4-sulfo-3-methylphenyl)-HN-(5-cyano-2,6-dichloropyrimidin-4-yl) |

EXAMPLE 38

Preparation of Micropartides with Diisocyanates Partially Blocked with Oximes:

The following solutions are prepared:

Solution I: 0.1 g of a commercial non-ionic surfactant are dissolved in deionized water to yield 100 g of a surfactant solution.

Solution II: 1 g of a commercial antimicrobial active substance (TRICLOSAN® available from Ciba Specialty Chemicals) is dissolved in 9 g of dimethyl phthalate. To this solution 1.5 g of the partially blocked diisocyanate according to Example 1 are added and the resulting solution is dyed with Rhodamin 6G.

Solution III: 2.48 g of poly vinyl amine obtained from BASF are dissolved in deionized water to yield 5.0 g of an aqueous poly vinyl amine solution.

Solution IV: 1.78 g of diethylene triamine is dissolved in deionized water to yield 5.0 g of an aqueous diethylene triamine solution.

Formation of the microparticles is carried out at 35° C. with a high speed agitator. Solution II is added dropwise to solution I and the mixture is emulsified for 2 minutes. Then, solution III is added dropwise to the mixture obtained and the reaction is continued for 5 minutes at 35° C. by agitating with a high speed agitator. Subsequently, solution IV is added dropwise to the reaction mixture. After the addition stirring is continued with a propellar-type general stirrer at 35° C. for 30 minutes and at 40° C. for further 30 minutes to finish curing of the shell. The suspension obtained is rinsed with deionized water until the rinsing water is neutral. Fine microparticles are obtained with an average particle size of 7.36 μm.

EXAMPLES 39 TO 44

Fine micropartides are likewise obtained with an average particle size as given in Table 4 by proceeding as indicated in Example 38, but using one of the partially blocked 2,4-toluylene diisocyanates as given in Table 4 in place of the partially blocked diisocyanate according to Example 1.

TABLE 4

| Example | partially blocked diisocyanate according to Example | average particle size $d_{50}$ [μm] |
|---|---|---|
| 39 | 2 | 7.16 |
| 40 | 3 | 7.99 |
| 41 | 4 | 7.76 |
| 42 | 5 | 7.40 |
| 43 | 6 | 8.00 |
| 44 | 7 | 7.80 |

EXAMPLE 45

Preparation of Microparticles with Diisocyanates Partially Modified with a Fiber Reactive Group:

The following solutions are prepared:

Solution I: 0.1 g of a commercial non-ionic surfactant are dissolved in deionized water to yield 100 g of a surfactant solution.

Solution II: 1 g of a commercial antimicrobial active substance (TRICLOSAN® available from Ciba Specialty Chemicals) is dissolved in 9 g of dimethyl phthalate. To this solution 2.3 g of the solution according to Example 8 containing the partially modified diisocyanate are added and the mixture is homogenized. Then, the mixture is dyed with Rhodamin 6G.

Solution III: 2.48 g of poly vinyl amine obtained from BASF are dissolved in deionized water to yield 5.0 g of an aqueous poly vinyl amine solution.

Solution IV: 1.78 g of diethylene triamine is dissolved in deionized water to yield 5.0 g of an aqueous diethylene triamine solution.

Formation of the microparticles is carried out at 35° C. with a high speed agitator. Solution II is added dropwise to solution I and the mixture is emulsified for 2 minutes. Then, solution III is added dropwise to the mixture obtained and the reaction is continued for 5 minutes at 35° C. by agitating with a high speed agitator. Subsequently, solution IV is added dropwise to the reaction mixture. After the addition stirring is continued with a propellar-type general stirrer at 35° C. for 30 minutes and at 40° C. for further 30 minutes to finish curing of the shell. The suspension obtained is rinsed with deionized water until the rinsing water is neutral. Fine microparticles are obtained with an average particle size of 7.44 μm.

EXAMPLES 46 TO 51

Fine micropartides are likewise obtained with an average particle size as given in Table 5 by proceeding as indicated in Example 45, but using the partially modified diisocyanate as given in Table 5 in place of the partially modified diisocyanate according to Example 8.

TABLE 5

| Example | partially modified diisocyanate according to Example | average particle size $d_{50}$ [μm] |
|---|---|---|
| 46 | 9 | 6.01 |
| 47 | 10 | 9.05 |
| 48 | 11 | 12.29 |
| 49 | 12 | 7.40 |
| 50 | 13 | 9.10 |
| 51 | 14 | 12.30 |

Fine micropartides are likewise obtained by proceeding as indicated in Example 45, but using the partially modified diisocyanates according to Examples 15 to 37 in place of the partially modified diisocyanate according to Example 8.

EXAMPLE 52

Preparation of Diisocyanates Partially Blocked with Imidazole (Blocking Degree 15%):

5.0 g (28.59 mmole) of 2,4-toluylene diisocyanate are dissolved in 30 ml of chloroform. To this solution at room temperature a solution of 0.29 g (8.58 mmole) of imidazole in 10 ml of chloroform is added dropwise while stirring vigorously. The reaction mixture is heated under reflux for 30 minutes and the solvent is distilled off. The product obtained is used directly for the preparation of the microparticles.

EXAMPLE 53

Preparation of Diisocyanates Partially Modified with Siloxane (Blocking Degree 15%):

5.0 g (28.59 mmole) of 2,4-toluylene diisocyanate are dissolved in 30 ml of methylene chloride. To this solution at room temperature a solution of 0.75 g (8.58 mmole) of 3-aminopropyl triethoxysilane in 10 ml of methylene chloride is added dropwise while stirring vigorously. The reaction mixture is heated under reflux for 30 minutes and the solvent is distilled off. The product obtained is used directly for the preparation of the microparticles.

EXAMPLE 54

Preparation of Microparticles with Diisocyanates Partially Blocked with Imidazol or Siloxane:

The following solutions are prepared:

Solution I: 0.1 g of a commercial non-ionic surfactant is dissolved in deionized water to yield 100 g of a surfactant solution.

Solution II: 1 g of a commercial UV-stabilizer (TINUVIN® 328 available from Ciba Specialty Chemicals) is dissolved in 9 g of a suspension of IRGAPHOR® Red (3.7%) in a semisynthetic glyceride (melting point: 35-37° C.). To this solution 1.5 g of the partially blocked diisocyanate according to Example 52 or 53 are added and the mixture is homogenized by stirring.

Solution III: 2.48 g of poly vinyl amine obtained from BASF are dissolved in deionized water to yield 5.0 g of an aqueous poly vinyl amine solution.

Solution IV: 1.78 g of diethylene triamine is dissolved in deionized water to yield 5.0 g of an aqueous diethylene triamine solution.

Formation of the microparticles is carried out at 35-60° C. with a high speed agitator. Solution II is added dropwise to solution I and the mixture is emulsified for 2 minutes. Then, solution III is added dropwise to the mixture obtained and the reaction is continued for 5 minutes under the conditions mentioned. Subsequently, solution IV is added dropwise to the reaction mixture. After the addition stirring is continued with a propellar-type general stirrer at 35° C. or 55° C. for 30 minutes and at 40° C. or 60° C. for further 30 minutes to finish curing of the shell. The suspension obtained is rinsed with deionized water until the rinsing water is neutral. Fine microparticles are obtained with an average particle size of 5-10 μm dependent on the agitation speed.

EXAMPLE 55

Preparation of Micropartides with Diisocyanates Partially Blocked with Imidazol or Siloxane:

The following solutions are prepared:

Solution I: 2.48 g of poly vinyl amine obtained from BASF are dissolved in deionized water to yield 100 g of an aqueous poly vinyl amine solution.

Solution II: 1 g of a commercial UV-stabilizer (TINUVIN® 328 available from Ciba Specialty Chemicals) is dissolved in 9 g of a suspension of IRGAPHOR® Red (3.7%) in a semisynthetic glyceride (melting point: 35-37° C.). To this solution 1.5 g of the partially blocked diisocyanate according to Example 52 or 53 are added and the mixture is homogenized by stirring.

Solution III: 1.78 g of diethylene triamine is dissolved in deionized water to yield 5.0 g of an aqueous diethylene triamine solution.

Formation of the microparticles is carried out at 35-60° C. with a high speed agitator. Solution II is added dropwise to solution I and the mixture is emulsified for 5 minutes. Then, solution III is added dropwise to the mixture obtained. After the addition the reaction is continued with a propellar-type general stirrer at 35° C. or 55° C. for 30 minutes and at 40° C. or 60° C. for further 30 minutes to finish curing of the shell. The suspension obtained is rinsed with deionized water until the rinsing water is neutral. Fine microparticles are obtained with an average particle size of 4-8 μm dependent on the agitation speed.

EXAMPLES 56 TO 59

Partially blocked diisocyanates are obtained with a blocking degree of 15% by proceeding as described in Example 1, but using in place of 5.0 g (28.59 mmole) of 2,4-toluylene diisocyanate (TDI) the equivalent amount of

EXAMPLE 56 3-isocyanate-methyl-3,5,5-trimethylcyclohexyl isocyanate (IPDI),
57 4,4'-methylenebis(cyclohexyl isocyanate) ($H_{12}MDI$),
58 4,4'-diphenylmethane diisocyanate (MDI),
59 1,4-xylylene diisocyanate (XDI).

EXAMPLES 60 TO 63

Fine micropartides are likewise obtained by proceeding as indicated in Example 38, but using one of the partially blocked diisocyanates as given in Examples 56 to 59 in place of the partially blocked diisocyanate according to Example 1.

APPLICATION EXAMPLE 1

1000 parts of a mixture are prepared by suspending in water 100 parts of the micropartides obtained according to Example 38 and 100 parts of MARLIPAL® 013/109 (surfactant available from SASOL). The mixture is homogenized for 15 minutes in an ultrasonic bath at 30° C. A cotton tricot fabric is impregnated with the mixture on a foulard such that it increases by approximately 100% of its weight. The padding process is repeated four times. Subsequently the fabric is dried below 80° C. and fixed for 1 minute at 150° C. or 170° C.

APPLICATION EXAMPLE 2

1000 parts of a mixture are prepared by suspending in water 100 parts of the micropartides obtained according to Example 45 and 100 parts of MARLIPAL® 013/109 (surfactant available from SASOL). The mixture is homogenized for 15 minutes in an ultrasonic bath at 30° C. A cotton tricot fabric is impregnated with the mixture on a foulard such that it increases by approximately 100% of its weight. The padding process is repeated four times. The fabric is fixed by treatment in an aqueous alkaline liquor containing 20 g/l of soda at 60° C. for 4 hours. The fabric is rinsed with water and subsequently dried.

APPLICATION EXAMPLE 3

1000 parts of a mixture are prepared by suspending in water 50 parts of the micropartides obtained according to Example 38 and 400 parts of CIBAFLUID® C (lubricant available from Ciba Specialty Chemicals). The mixture is homogenized for 15 minutes in an ultrasonic bath at 30° C. A cotton tricot fabric is impregnated with the mixture on a foulard such that it increases by approximately 100% of its weight. The padding process is repeated four times. Subsequently the fabric is dried below 80° C. and fixed for 1 minute at 150° C. or 170° C.

APPLICATION EXAMPLE 4

1000 parts of a mixture are prepared by suspending in water 50 parts of the micropartides obtained according to Example 45 and 400 parts of CIBAFLUID® C (lubricant available from Ciba Specialty Chemicals). The mixture is homogenized for 15 minutes in an ultrasonic bath at 30° C. A cotton tricot fabric is impregnated with the mixture on a foulard such that it increases by approximately 100% of its weight. The padding process is repeated four times. The fabric is fixed by treatment in an aqueous alkaline liquor containing 20 g/l of soda at 60° C. for 4 hours. The fabric is rinsed with water and subsequently dried.

The finished fabrics are submitted to a washing test at 40° C. (1 time, 5 times, 10 times and 20 times) under the following conditions:
Detergent: 30 g ECE Coulour Fastness Test Detergent 77
Washing machine: Wascator FOM 71MP LAB
Washing time: 10 minutes
Rinsing: 2× for 1 minute with each 20 l of water Covalently bound micropartides are verified by determination of the color retention of Rhodamine 6G after washing via colorimetry. Retention of active compounds (TRICLOSAN® or TINUVIN® 328) is verified by accelerated solvent extraction (DIONEX) of the finished, unwashed and washed fabrics with isopropanol and determination of the extracted active compound by HPLC.

The finished fabrics obtained with the functionalized particles according to the present invention show superior retention of Rhodamine 6G and active compounds than a comparative fabric finished with non-functionalized particles prepared with the corresponding diisocyanate containing no blocking or reactive groups.

What is claimed is:

1. Functionalized particles having fully formed outer shells and cores comprising a polyurethane or polyurea matrix said outer shells obtained by interfacial addition polymerisation of (i) at least one partially blocked polyisocyanate obtained by the reaction of a polyisocyanate with 10 to 15 mol % total, based on the stoichiometric amount of isocyanate groups contained within the polyisocyanate of a blocking group precursor selected from an active methylene compound, a bisulfite, a phenol, a pyridinol, a thiophenol, a mercaptopyridine, a mercaptane, an oxime, an amide, a cyclic amide, an imide, an imidazole, an amidine, a pyrazole, a triazole, a siloxane and a benzoxazolone and (ii) at least one polyamine or polyhydric alcohol, said fimetionalized particles being capable to chemically or physically bind to a substrate.

2. Functionalized particles according to claim 1, wherein the blocking group precursor is an oxime.

3. Functionalized particles according to claim 1, wherein the blocking group precursor is an imidazole.

4. Functionalized particles according to claim 1, wherein the blocking group precursor is a siloxane.

5. Functionalized particles according to claim 1, wherein the polyisocyanate is a diisocyanate or a triisocyanate.

6. A process for preparing functionalized particles comprising preparing an oil-in-water dispersion and causing condensation polymerisation at the oil-water interface around each dispersed oil droplet of (i) at least one partially blocked polyisocyanate dissolved in the oil phase and (ii) at least one polyamine or polyhydric alcohol dissolved in the aqueous phase wherein the partially blocked polyisocyanate is obtained by the reaction of a polyisocyanate with 10 to 15 mol %, based on the stoichiometric amount of isocyanate groups contained within the polyisocyanate of a blocking group precursor selected from an active methylene compound, a bisulfite, a phenol, a pyridinol, a thiophenol, a mercaptopyridine, a mercaptane, an oxime, an amide, a cyclic amide, an imide, an imidazole, an amidine, a pyrazole, a triazole, a siloxane and a benzoxazolone.

7. A process according to claim 6, wherein the oil phase additionally contains a substance which is to be encapsulated.

8. A process for the preparation of a substrate modified with the functionalized particles according to claim 1, comprising reacting the substrate with the functionalized particles according to claim 1, so that the functionalized particles chemically or physically bind to the substrate.

9. A process according to claim 8, wherein the substrate is a fiber material containing a hydroxyl group or nitrogen.

10. A process according to claim 8, wherein the substrate is a cellulosic fiber material.

11. A process according to claim 8, wherein the substratae is a natural or synthetic polyamide fiber material.

* * * * *